United States Patent [19]

Frei et al.

[11] 4,198,268

[45] Apr. 15, 1980

[54] PROCESS FOR PRODUCING COLORED PAPER USING GRANULATED DYE COMPOSITIONS

[75] Inventors: Alfred Frei, Thalwil; Helmut Moser, Reinach; Georg Schoefberger, Basel; August Schweizer, Muttenz, all of Switzerland

[73] Assignee: Sandoz Ltd., Basel, Switzerland

[21] Appl. No.: 605,971

[22] Filed: Aug. 20, 1975

Related U.S. Application Data

[63] Continuation of Ser. No. 239,360, Mar. 29, 1972, abandoned, which is a continuation-in-part of Ser. No. 60,115, Jul. 31, 1970, abandoned, which is a continuation-in-part of Ser. No. 761,333, Sep. 20, 1968, abandoned.

[30] Foreign Application Priority Data

Sep. 22, 1967 [CH] Switzerland .................. 13321/67

[51] Int. Cl.² ............................................. D21H 3/80
[52] U.S. Cl. ........................................ 162/162; 8/7; 8/41 R; 8/42 R; 8/79
[58] Field of Search ............................. 8/79; 162/162

[56] References Cited

U.S. PATENT DOCUMENTS

| 935,016 | 9/1909 | Gunther | 260/175 |
|---|---|---|---|
| 935,017 | 9/1909 | Gunther | 260/175 |
| 1,647,162 | 11/1925 | Wenken | 8/79 |
| 2,323,871 | 7/1943 | Kienle | 8/62 |
| 2,574,597 | 11/1951 | Salvin et al. | 8/79 |
| 2,930,760 | 3/1960 | Gebhardt | 252/110 |
| 3,336,155 | 8/1967 | Rowe | 8/79 |
| 3,537,807 | 11/1970 | Streck | 8/7 |
| 3,565,570 | 2/1971 | Dien | 8/7 |
| 3,643,269 | 2/1972 | Schweyer | 8/79 |
| 3,931,037 | 1/1976 | Hall | 8/79 |

FOREIGN PATENT DOCUMENTS

1572030 6/1969 France.

OTHER PUBLICATIONS

Fierz–David et al., Fundamental Processes of Dye Chemistry, p. 377, Pub. 1949 by Interscience Pub. Inc.
Parrott, et al., Proc. Tech. Soc. Paper Makers Associates, vol. 35, No. 1.
Remington, Practice of Pharmacy, 10th Edition p. 325, Pub. by The Mack Pub. Co., Easton, Pa.

*Primary Examiner*—Donald Levy
*Attorney, Agent, or Firm*—Gerald D. Sharkin; Richard E. Vila; Melvyn M. Kassenoff

[57] ABSTRACT

A process for the dyeing of paper with granulated dyeing preparations, preferably dissolved in water. For the process granulated dyeing preparations are used which consist of
  (a) a dye soluble to at least 2% in water at 25° C. and
  (b) in an amount not greater than 50%, a salt which dissociates in water, the average size of the granules being at least 20 microns.

18 Claims, No Drawings

PROCESS FOR PRODUCING COLORED PAPER USING GRANULATED DYE COMPOSITIONS

This application is a continuation of application Ser. No. 239,360, filed Mar. 29, 1972 and now abandoned, which in turn is a continuation-in-part of application Ser. No. 60,115, filed July 31, 1970 and now abandoned, which in turn is a continuation-in-part of application Ser. No. 761,333, filed Sept. 20, 1968 and now abandoned.

This application is directed to a process for the dyeing of paper with granulated dyeing preparations, preferably dissolved in water. For the process granulated dyeing preparations are used which consist of (a) a dye soluble to at least 2% in water at 25° C. and (b) in an amount not greater than 50% (preferably 5 to 50%) a salt which dissociates in water, the average size of the granules being at least 20 microns.

The dyes soluble to at least 2% in water may be of anionic, cationic or non-ionic character. The water-solubilizing group in the anionic dyes may be, for example, one of the following: $-PO_3H_2$, $-AsO_3H_2$, $-COOH$, $-SO_2-NH$-acyl, $-SO_2-NH_2$, $-SO_2-NH$-alkyl,

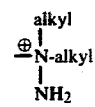

where Me stands for a cobalt or chromium atom and Y for $-O-$ or $-COO-$.

The preferred water-solubilizing groups are $-O-SO_3H$ and $-SO_3H$. These groups are generally present in the form of alkali metal (Na, K), ammonium or water-soluble amine salts.

The cationic dyes may bear as water-solubilizing group a hydrazinium group, e.g.

$$\overset{alkyl}{\underset{NH_2}{\overset{|}{\underset{|}{\overset{\oplus}{N}}}-alkyl}}$$

or quaternary ammonium or phosphonium groups.

The non-ionic a dye of one may contain, for example, one or more polyethylene oxide chains ($-CH_2CH_2-O)_n-H$ or polyol radicals, in particular sugar radicals.

Dyeings of good quality are obtainable with aqueous solutions of granulated dyeing preparations containing dyes of the following formulae:

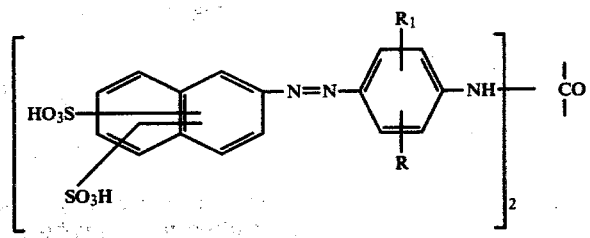

(I),

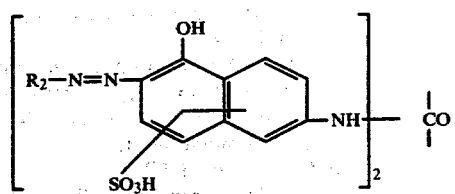

(II),

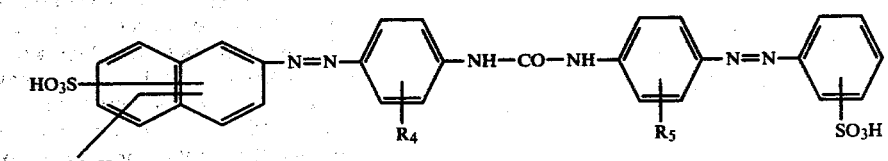

(VI),

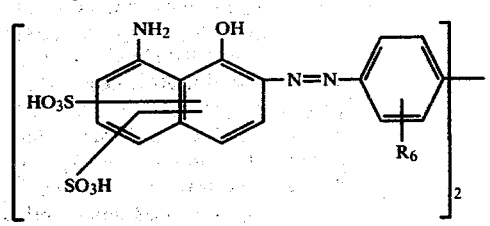

(VII),

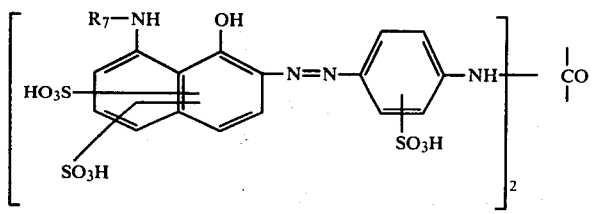 (VIII),

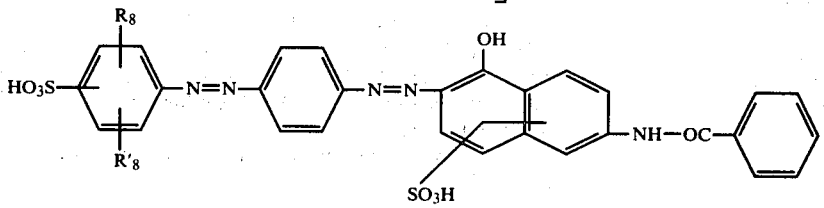 (IX),

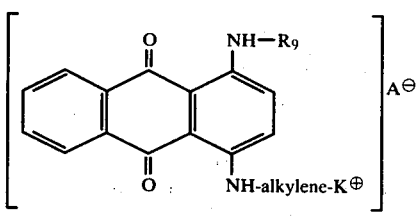 (X),

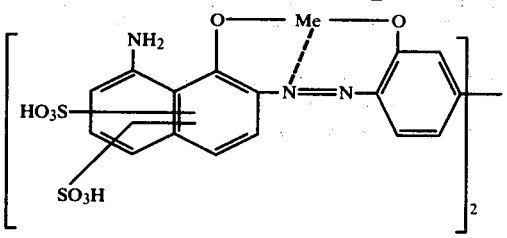

and [copper phthalocyanine] (—SO$_2$—NH-alkylene-K$^\oplus$)$_4$A$^\ominus$ (XII) where R represents hydrogen, alkyl or alkoxy, R$_1$ is hydrogen or alkyl, R$_2$ is a radical of the formula

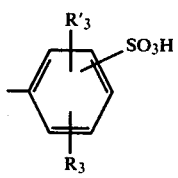 (III)

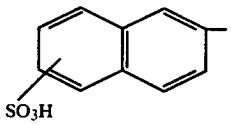 (IV)

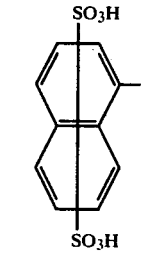 (V)

where
R$_4$ is an alkyl radical,
R$_5$ is an alkoxy radical,
R$_6$ is hydrogen, alkyl or alkoxy,
R$_7$ is hydrogen or

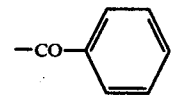

R$_8$ is hydrogen or an alkyl radical,
R'$_8$ is hydrogen or a sulphonic acid group,
R$_9$ is hydrogen, alkyl, cycloalkyl, e.g. cyclohexyl, or aryl, e.g. phenyl,
K$^\oplus$ is a hydrazinium or ammonium radical,
A$^\ominus$ is an anion, e.g. chloride, bromide, sulphate, disulphate, acetate, or methyl sulphate,
Me is a metal atom,
and in formula (III)
R$_3$ is hydrogen or an alkyl radical and
R'$_3$ is hydrogen or a sulphonic acid group.

The alkylene radicals advantageously contain 1 to ;b 6 or preferably 1 to 3 carbon atoms.

The dyes may be selected from any desired series, for example the azo series (monoazo, disazo and polyazo dyes and their metal complex compounds containing as metals chromium, cobalt, copper or nickel), the anthraquinone series (e.g. 1-amino-2-sulpho-4-arylamino, 1,4- and 1,5-diarylamino-, 1-amino-2-aryloxy-4-arylaminoanthraquinones, 4-alkylaminoanthraquinonyl-1-salts), the nitro series, the phthalocyanine series(copper and nickel phthalocyanines), the triarylmethane, oxazine, thiazine, dioxazine, xanthine, quinophthalone, diazine, naphthazarine series, the sulphated leucoindigo and sulphated leuco-anthraquinone series.

The anionic dyes may belong to the acid class used for the dyeing and printing of wool, silk, polyamide and polyurethane fibres or to the direct class used for dyeing and printing natural and regenerated cellulosic fibres such as cotton, linen, hemp, viscose and cuprammonium rayon. This latter class includes the sulphated leuco-vat dyes. Further, reactive dyes which bear a reactive group forming a chemical linkage with the fibre may be used. Suitable reactive groups are, for example, groups of the heterocyclic series (triazine, diazine, oxazine and thiazine groups), mono- and dihalotriazinyl, mono-, di- and trihalopyrimidyl, 2,3-dihaloquinoxalyl-5- and -6-carboxyl, -sulphonyl- and -aminocarbonyl-, 2-2-halobenzoxazole, 2- halobenzothiazole-5-carbonyl- and -6-sulphonyl, dihalopyrimidyl-5-carbonyl, dihalopyrimidyl-5-methylene groups, and in the aliphatic series haloalkanoyl, haloalkenoge, alkenoyl, sulphat-alkanoyl, alkyl- and aryl-sulphonyloxy-alkanoyl, halo- and sulphato-alkylsulphonyl and alkenylsulphonyl groups. These groups may be bound to the dye molecule through an unsubstituted or monosubstituted imino group and possibly an aliphatic chain. Besides the imino bridge, the —O— and —S— bridge members are suitable for the mono- and di-halotriazinyl, mono-, di- and tri-halopyrimidyl- and dihalopyrimidyl-5-methylene groups, while the halo- and sulphato-alkylsulphonyl groups and the alkenylsulphonyl group are bound directly to the dye molecule. Other reactive groups such as sulphatoalkylaminosulphonyl and N-sulphatoalkyl-N-alkylaminoalkylene groups are as a rule also bound directly to the dye molecule. In the aforenamed reactive groups bromine and fluorine atoms and, particularly chlorine atoms may be present.

The dyes must contain the number of water-solubilizing groups necessary to impart a solubility in water of at least 2% at 25° C., for example, at least 1 and preferably 2 to 6 sulphonic acid groups in the anionic azo dyes and 2 to 4 sulphonic acid groups in the anionic anthraquinone and phthalocyanine dyes, although some of these sulphonic acid groups may be replaced by —COO— or —$SO_2$—$NH_2$— groups. The cationic dyes contain at least 1 and preferably 2 to 4 hydrazinium or ammonium groups.

The substantive metal-free and metal-containing (Cu, Ni) disazo dyes and the substantive reactive dyes are the preferred series for the dyeing preparations according to this invention.

The salts which dissociate in water are primarily the neutral salts of alkali metals, preferably NaCl, KCl, $Na_2SO_4$, $K_2SO_4$, and $NaPO_3$. Salts of alkaline reaction such as $Na_2CO_3$, $K_2CO_3$, $Na_2HPO_4$, $Na_4P_2O_7$ and $K_4P_2O_7$ can be used for dyeing preparations intended for dyeing cellulosic fibres or paper, while acid reacting salts such as $KH_2PO_4$, $K_2H_2P_2O_7$, $(NH_4)_2SO_4$ and $NH_4Cl$ can be employed for dyeing preparations for application to wool, silk and polyamide fibres. Normally, however, salts of alkaline or acid reaction are used only in small amounts, e.g. as standardizing agents alongside the neutral salts. Other suitable non-ionic standardizing agents are, for example, urea, dextrin, sulphite cellulose decomposition products, dispersing agents such as dinaphthylmethanedisulphonic acid and ligninsulphonic acid in the form of the alkali metal salts, alkanoylaminopheryl-, alkenoylaminophenyl-, alkanoylaminoalkyl-, alkenoylaminoalkyltrialkylammonium and -dialkyl-benzylammonium salts (chloride, bromide, sulphate), alkyl polyglycol ethers, alkenyl polyglycol ethers and alkylphenyl polyglycol ethers with more than 20 mols of ethylene oxide, and condensation products of polypropylene glycol of molecular weight 1700 with about 140–150 mols of ethylene oxide. In the cationic dispersing agents, the alkanoyl and alkenoyl radicals are derived from higher fatty acids, while alkyl stands preferably for methyl, ethyl, propyl or butyl. In the non-ionic dispersing agents the alkyl or alkenyl groups contain preferably 12 to 22 carbon atoms and the alkylphenyl groups are preferably octylphenyl, nonylphenyl or dodecylphenyl groups.

The dispersing agents are employed effectively in amounts of not more than about 10%, preferably about 2–5%, of the dyeing preparation. In order to prevent precipitation, the dispersing agents are selected to be either cationic or anionic like the dyes in the preparations. Non-ionic dispersing agents can of course be used with any desired dyes.

The dyes can be employed singly or in mixtures of two, three or more, and similarly the salts can be used alone or in mixture, In the case of dye mixtures attention must be paid to the fact that cationic and anionic dyes are precipitated by interaction and may not be used together.

The dyeing preparations used in this invention can be produced, for example, by suspending the dye or dyes, the salt or salts and one or more standardizing agents as required in about two to ten, preferably two and a half to five, times the amount of water, homogenizing the suspension and drying it in an atomizer, to obtain granules which dust very little and dissolve rapidly in water. In comparison with the dyeing preparations in powder form used to date, the granulated preparations have the advantage of better wettability in water and higher solubility in water, this being especially the case with those containing at most 30% of a salt which dissociates in water. Concentrated stock solutions can therefore be prepared from the preparations.

The cost of transportation of the disclosed preparations is lower and they are more suitable for dry addition to the stock in paper manufacture. In comparison with liquid dyeing preparations they have the advantage of greater tinctorial strength, better storage stability and lower transport costs. They are also suitable for the exhaust dyeing, pad dyeing and printing of textiles made of wool, silk, polyamide, polyurethane and natural and regenerated cellulose fibres and of leather.

This invention relates further to a process for the dyeing of paper, wherein dyes of the formulae (I), (II) and (VI) to (XII), the dyes marked A to T and those described in Examples 3 and 23 are employed.

The dyeing of paper, either with the dyes of formulae (I), (II), (VI) to (XII), dyes A to T or those of Examples 3 to 23, or by the process of this invention using granulated dyeing preparations dissolved in water, is carried out by one of the known methods.

Dyeing and printing of paper can be carried out at a pH in the region of 1 to 14, preferably 4 to 9, more preferably 5.5 to 6.5, and at a temperature in the range of 5° to 60° C., preferably at 20° C., i.e. ambient temperature.

In the following Examples the parts and percentages are by weight and the temperatures are in degree centigrade.

EXAMPLE 1

62.5 parts of the dye of the formula

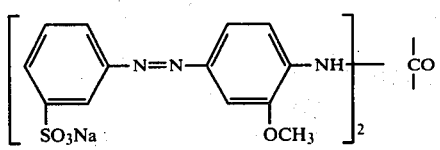

33.5 parts of anhydrous sodium sulphate and 4 parts of sodium ligninsulphonate are stirred into 300 parts of water. The suspension thus formed is homogenized and atomized in the normal way to give a granulated product. The granules dissolve readily in water and are very suitable for dyeing paper in yellow shades. The dye of this example is disclosed in U.S. Pat. Nos. 935,016 and 3,643,269, German Pat. 216,666 and French Pat. No. 1,572,030. It and many of the other dyes of this application can also be synthesized by the process of U.S. Pat. No. 935,017.

DYEING EXAMPLE A A suspension of 100 parts of chemically bleached sulphite pulp in 2000 parts of water is beaten in a hollander beater, a solution of 0.1 part of the dyeing preparation of Example 1 in 5 parts of water is added and after a further 15 minutes the size, after which the dyeing is fixed. Paper made from this stock is dyed in a yellow shade of medium depth with good fastness properties. The backwater is colourless.

EXAMPLE 2

60 Parts of the dye of the formula

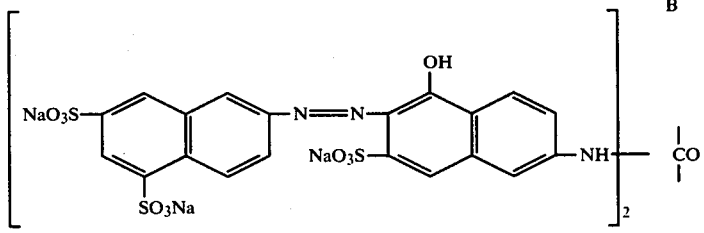 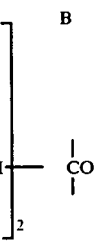

are suspended in a solution of 40 parts of anhydrous sodium sulphate in 200 parts of water at room temperature, homogenized and then atomized. Red granules are obtained which dissolve readily in water and dye paper in red shades.

DYEING EXAMPLE B

A mixture of 70 parts of chemically bleached sulphite pulp (from softwood) and 30 parts of chemically bleached sulphite cellulose (from hardwood) in 2000 parts of water is beaten in a pulper. 0.05 Parts of the dyeing preparation of Example 2 are sprinkled into the mixture, which is converted into absorbent paper of pale scarlet shade.

EXAMPLE 3

20 Parts of sodium sulphate are dissolved in a solution of 44 parts of the dye of the formula

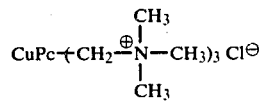

in 150 parts of water, after which the solution is dried in an atomizer to give a granulated preparation. The granules dissolve readily in water and are highly suitable for dyeing paper by the method described in Dyeing Example B. Using this method, absorbent papers of turquoise shade with good wet and alcohol fastness are obtained.

The dyeing preparations listed in the following table are produced in accordance with the procedures of Example 1 or 3 and are distinguished in the table by their composition and the shade of the dyeings on paper. These dyeing preparations are applicable to paper by the methods of Dyeing Examples A and B.

Table

| Example No. | Dye | parts | Na$_2$SO$_4$ calc. parts | Dispersing agent parts | average size of the granulated dye preparations in μ | Shade of paper dyeing |
|---|---|---|---|---|---|---|
| 4 | C | 78 | 22 | — | 90 | yellow |
| 5 | D | 65 | 35 | — | 90 | " |
| 6 | E | 65 | 35 | — | 90 | " |
| 7 | F | 70 | 27 | 3 parts sodium ligninsulphonate | 90 | reddish yellow |
| 8 | G | 68 | 32 | — | 20 | reddish yellow |
| 9 | H | 65 | 35 | — | 60 | yellowish red |
| 10 | I | 50 | 50 | — | 115 | red |
| 11 | K | 50 | 50 | — | 115 | " |
| 12 | L | 80 | 20 | — | 65 | bluish red |
| 13 | M | 75 | 25 | — | 40 | violet |
| 14 | N | 60 | 40 | — | 110 | blue |
| 15 | O | 60 | 40 | — | 110 | " |
| 16 | P | 80 | 20 | — | 65 | " |
| 17 | Q | 70 | 30 | — | 65 | greenish blue |
| 18 | R | 80 | 20 | — | 200 | turquoise |
| 19 | S | 60 | 40 | — | 90 | bluish red |
| 20 | T | 60 | 40 | — | 110 | blue |

Particularly good paper dyeings are obtained with the dyes of the dyeing preparations of Examples 1, 3, 8, 10, 14, 15 and 17.
The dyes referred to in Table I are of the following formulae:
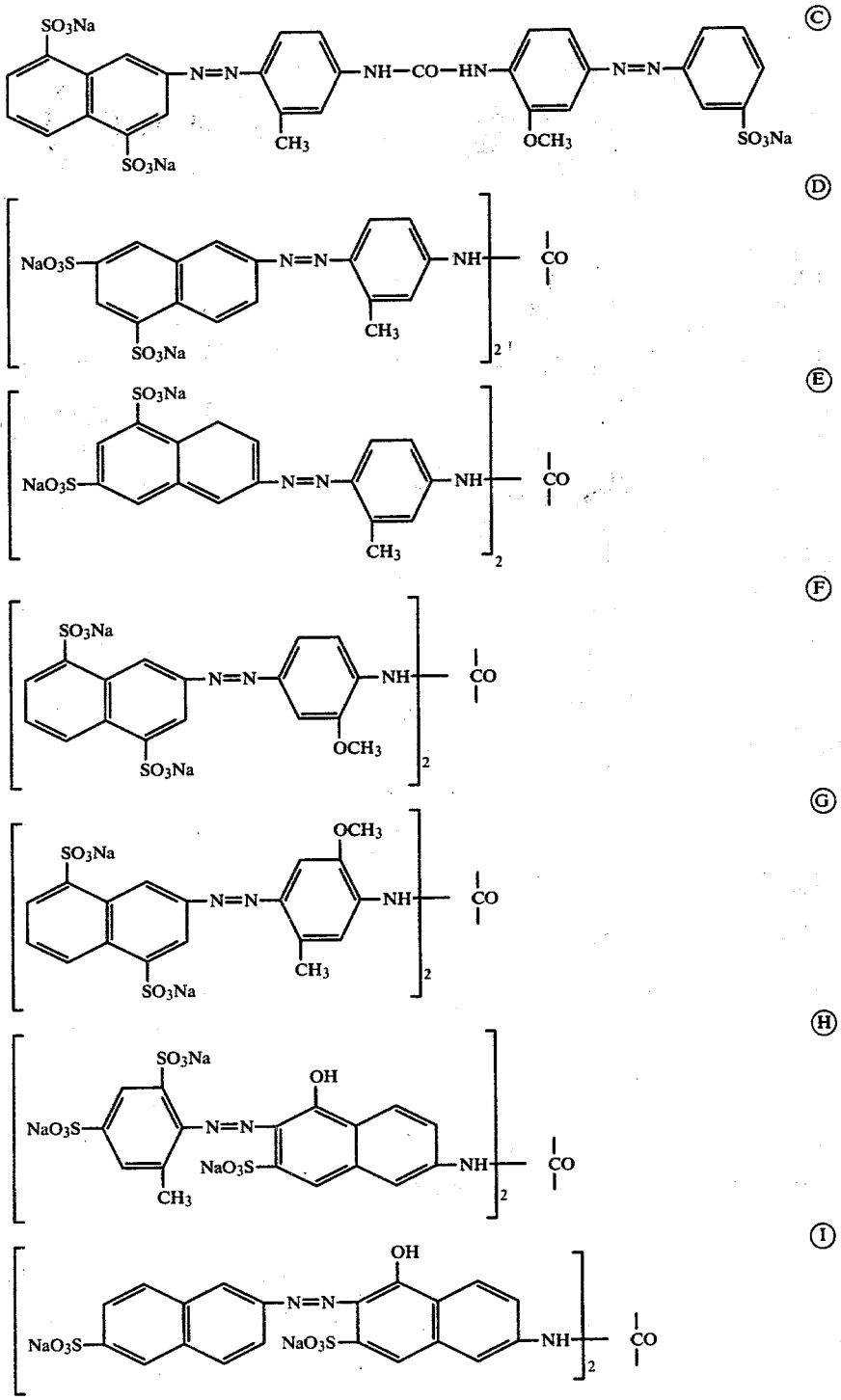

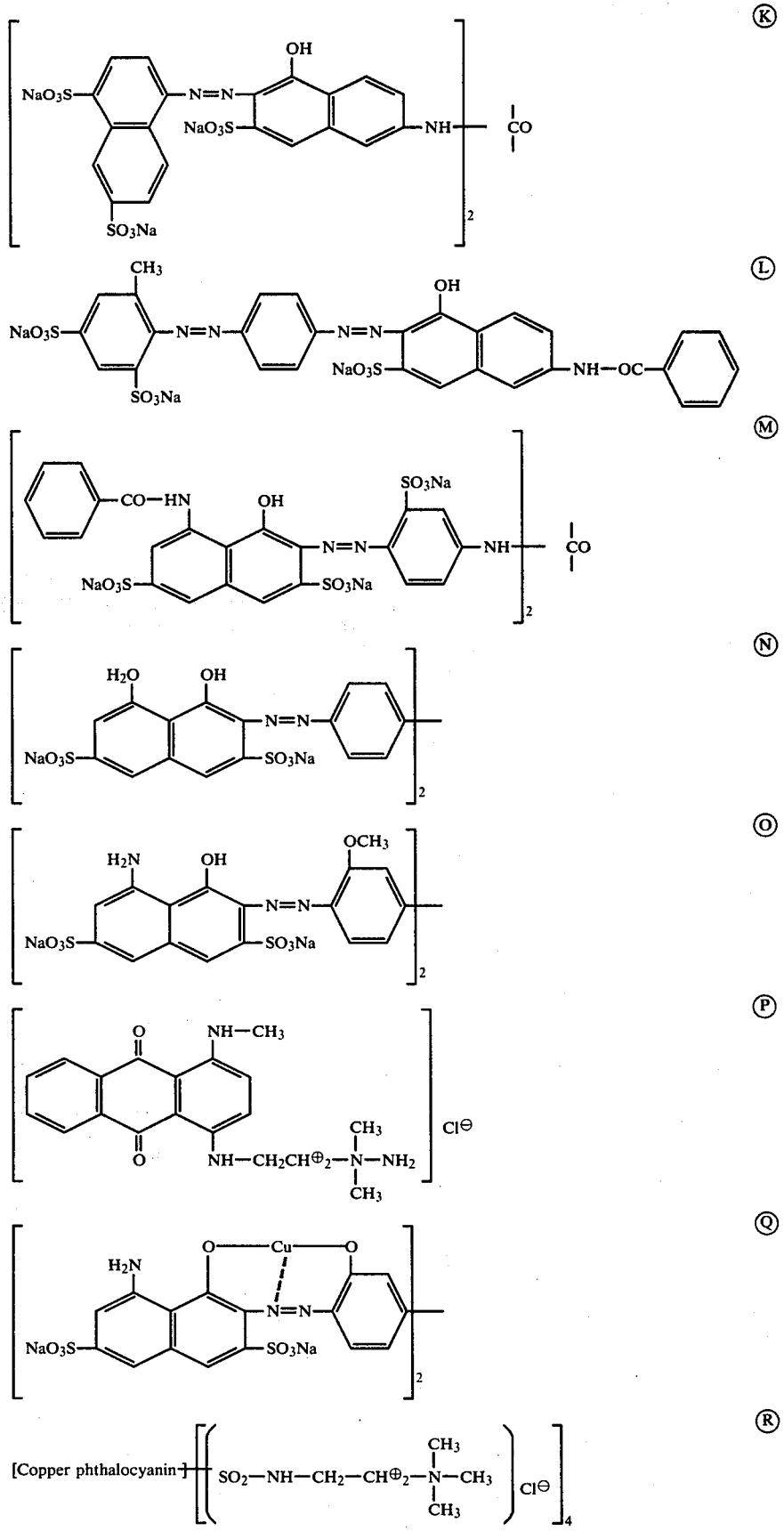

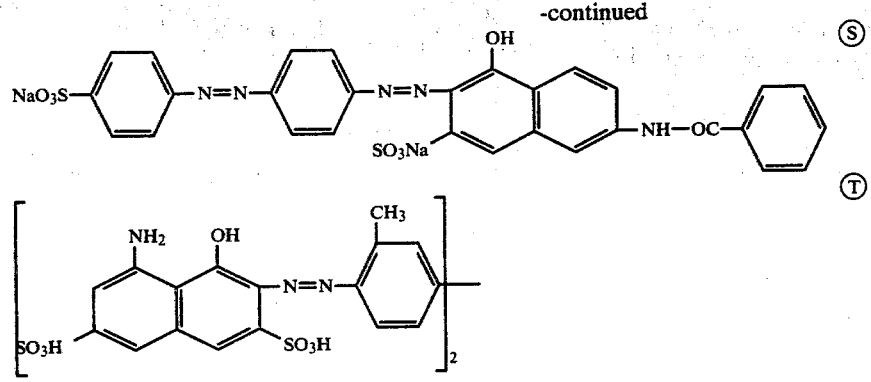

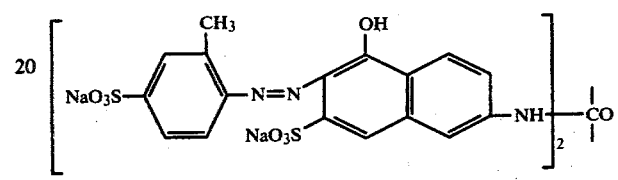

EXAMPLE 21

(Preparation of a Dyebath)

1.5 Parts of the dyeing preparation produced as given in Example 1 are dissolved in 2000 parts of water.

EXAMPLE 22

(Preparation of a Padding Liquor)

4 Parts of the dyeing preparation described in Example 8 and 20 parts of urea are dissolved in 400 parts of urea and 2 parts of locust bean gum are stirred into the solution. Then 3 parts of lauryl glycol ether sulphonate containing 3 mols of ethylene oxide groups, 3 parts of nonylphenyl polyglycol ether containing 4.5 mols of ethylene oxide groups and 5 parts of glacial acetic acid are added.

EXAMPLE 23

(Preparation of a Printing Paste)

280 Parts of water at 40° are poured upon 10 parts of the solid dyeing preparation of Example 1, with stirring to dissolve. The solution is stirred into 550 parts of a 30% aqueous crystal gum solution containing 50 parts of urea, 50 parts of thiodiethylene glycol and 60 parts of a 30% aqueous ammonium sulphate solution.

If the dyeing preparations used in Examples 21 to 23 are replaced by any other of the preparations specified in Table I, equally good dyebaths, padding liquors and printing pastes are obtained.

EXAMPLE 24

95 Parts of the dye of Example Ⓐ in Example 1 and 5 parts of sodium chloride are stirred into 400 parts of water at room temperature to give a suspension which is homogenized and atomized. Yellow granules are obtained which are well soluble in water. They are suitable for dyeing paper in yellow shades.

If the 5 parts of sodium chloride used in this Example are replaced by 5 parts of sodium metaphosphate, a yellow granulated preparation is obtained which gives dyeings on paper showing comparable good properties.

EXAMPLE 25

95 Parts of the dye of the formula are stirred into a solution of 5 parts of sodium carbonate in 350 parts of water at room temperature. The solution is homogenized and atomized to give red granules which dissolve well in water and are suitable for dyeing paper in reddish orange shades.

A red granulated preparation which gives paper dyeings with similarly good properties is obtained when the 5 parts of sodium carbonate in this Example are replaced by 10 parts of sodium carbonate or 5 parts of potassium carbonate.

EXAMPLE 26

50 Parts of the dye of formula Ⓐ in Example 1 are stirred into a mixture of 250 parts of water, 5 parts of sodium chloride and 20 parts of dextrin, homogenized and dried in an atomizer. The resulting granules dissolve readily in water and are very suitable for dyeing paper in yellow shades.

If the 20 parts of dextrin in this Example are replaced by 20 parts of urea, granules are obtained which dye paper with comparably good fastness properties.

We claim:

1. In a process for producing colored paper comprising incorporating a dye composition into paper stock and forming paper from said paper stock the improvement wherein said dye composition is a granulated dye composition, said granulated dye composition comprising (a) the dye of the formula

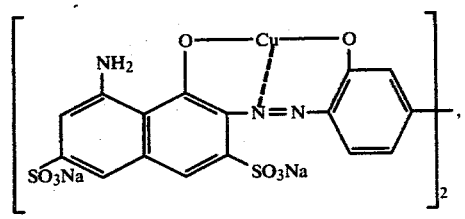

and (b) 5 to 50% of a salt selected from the group consisting of NaCl, KCl, $Na_2SO_4$, $K_2SO_4$, $NaPO_3$, $Na_2CO_3$, $K_2CO_3$, $NaHPO_4$, $Na_4P_2O_7$ and $K_4P_2O_7$, or a mixture thereof, with the proviso that the average size of the granules of said granulated dye composition is at least 20 microns.

2. In a process for producing colored paper comprising incorporating a dye composition into paper stock and forming paper from said paper stock, the improvement wherein said dye composition is a granulated dye composition, said granulated dye composition consisting essentially of (a) a dye of the formula

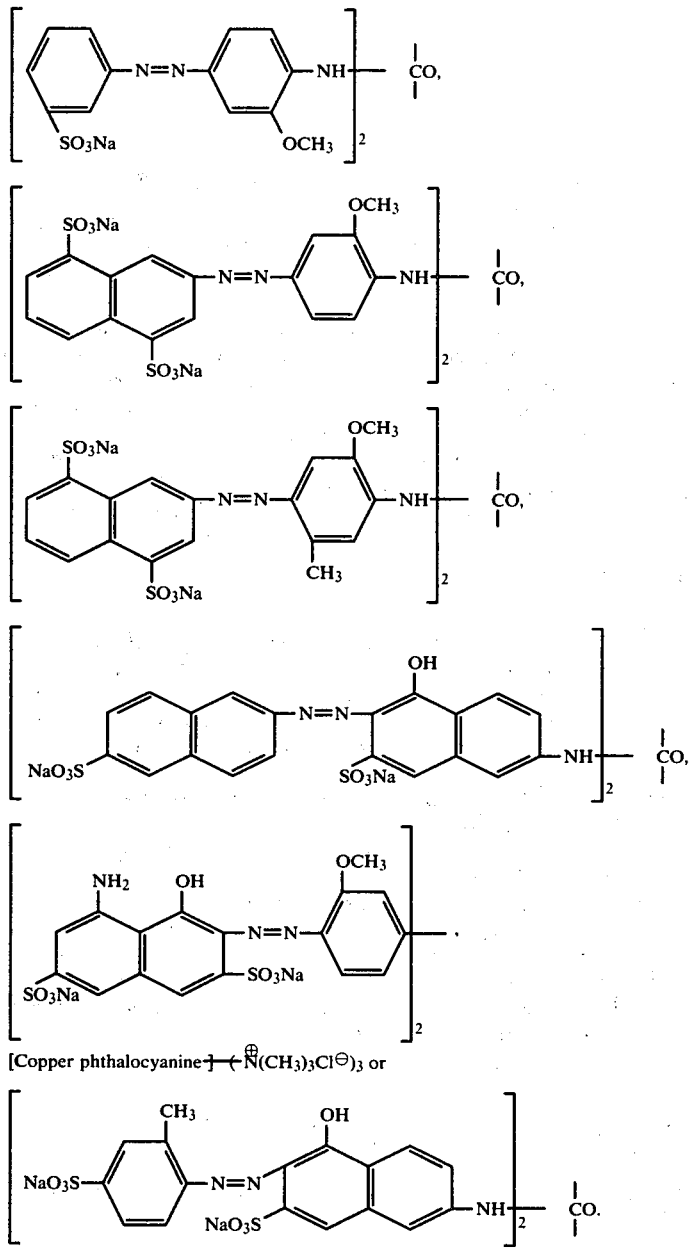

(b) 5 to 50% of a salt selected from the group consisting of NaCl, KCl, Na₂SO₄, K₂SO₄, NaPO₃, Na₂CO₃, K₂CO₃, Na₂HPO₄, Na₄P₂O₇ or K₄P₂O₇, or a mixture thereof, and, optionally, (c) urea, dextrin or sodium ligninsulfonate, or a mixture thereof, with the proviso that the average size of the granules of said granulated dye composition is at least 20 microns.

3. A process according to claim 2 wherein (b) is 5 to 50% of a salt selected from the group consisting of NaCl, KCl, Na₂SO₄, K₂SO₄, NaPO₃, Na₂CO₃ or K₂CO₃, or a mixture thereof.

4. A process according to claim 3 wherein (b) is 5 to 50% of a salt selected from the group consisting of NaCl, KCl, Na₂SO₄, K₂SO₄, NaPO₃, Na₂CO₃ or K₂CO₃.

5. A process according to claim 4 wherein said granulated dye composition consists essentially of (a) a dye of the formula

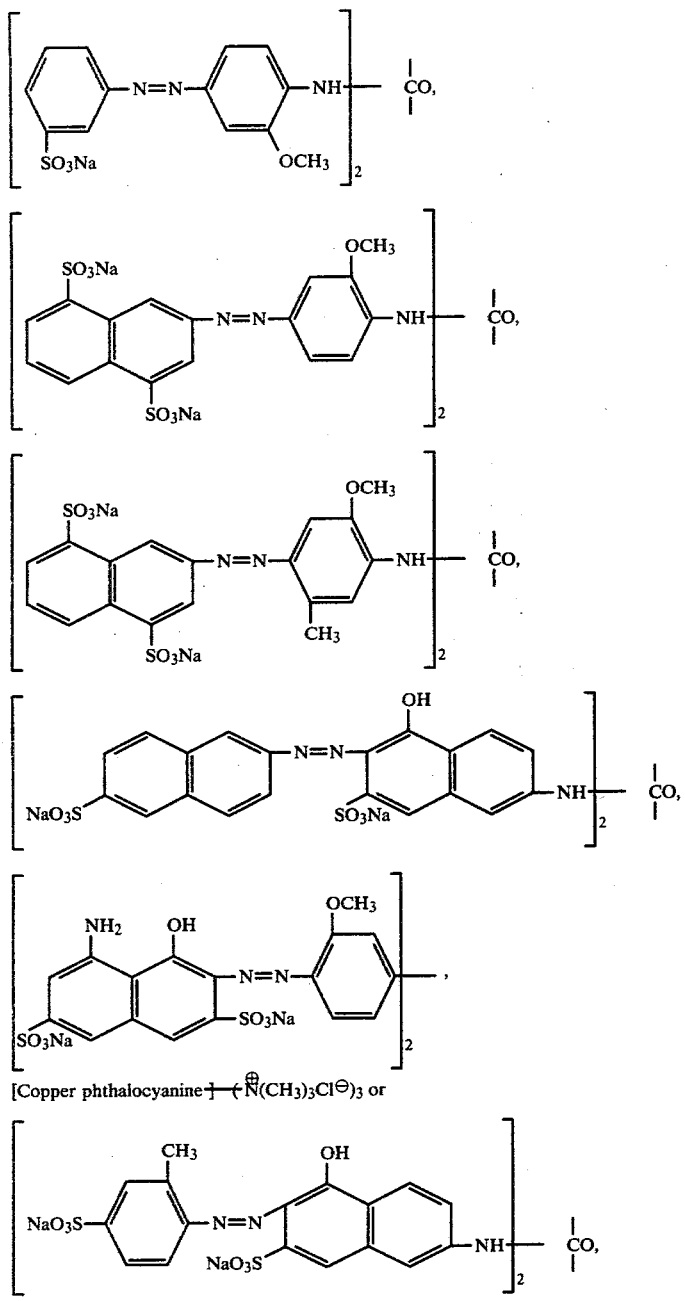

(b) 5 to 50% of a salt selected from the group consisting of NaCl, KCl, Na$_2$SO$_4$, K$_2$SO$_4$, NaPO$_3$, Na$_2$CO$_3$ and K$_2$CO$_3$ and, optionally, (c) urea, dextrin or sodium ligninsulfonate.

6. A process according to claim 5 wherein (b) is 5 to 50% of a salt selected from the group consisting of NaCl, Na$_2$SO$_4$, NaPO$_3$, Na$_2$CO$_3$ and K$_2$CO$_3$.

7. A process according to claim 6 wherein (b) is 5 to 50% of a salt selected from the group consisting of NaCl, Na$_2$SO$_4$ and NaPO$_3$.

8. A process according to claim 6 wherein (c), when present, is urea.

9. A process according to claim 6 wherein (a) is the dye of the formula

10. A process according to claim 6 wherein (a) is the dye of the formula

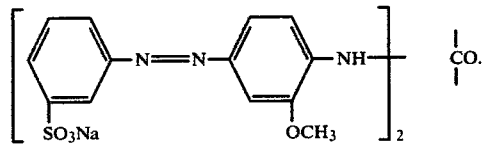

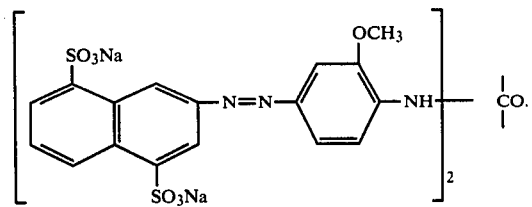

11. A process according to claim 6 wherein (a) is the dye of the formula

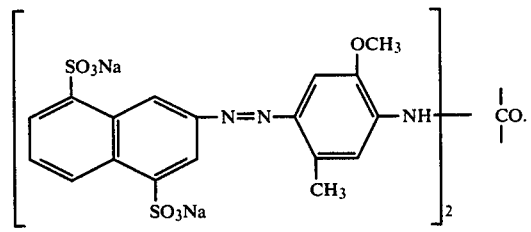

12. A process according to claim 6 wherein (a) is the dye of the formula

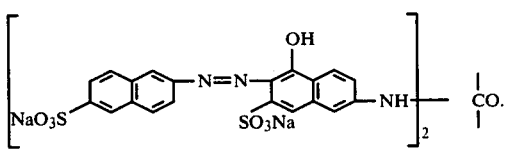

13. A process according to claim 6 wherein (a) is the dye of the formula

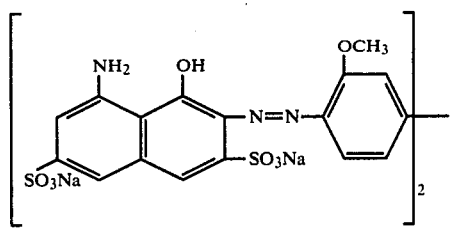

14. A process according to claim 6 wherein (a) is the dye of the formula

[Copper phthalocyanine]($CH_2-N^{\oplus}(CH_3)_3\ Cl^{\ominus})_3$.

15. A process according to claim 6 wherein (a) is the dye of the formula

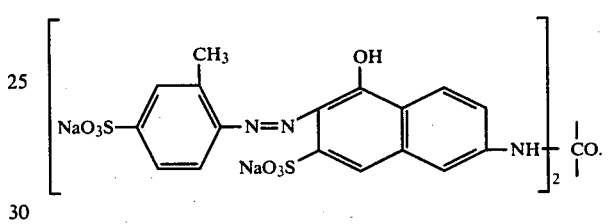

16. A process according to claim 3 wherein (c), when present, is urea, dextrin or sodium ligninsulfonate.

17. A process according to claim 7 wherein (b) is 5 to 50% of sodium sulfate.

18. A process according to claim 17 wherein (c), when present, is sodium ligninsulfonate.

* * * * *

UNITED STATES PATENT AND TRADEMARK OFFICE
CERTIFICATE OF CORRECTION

PATENT NO. : 4,198,268

DATED : April 15, 1980

INVENTOR(S) : Alfred Frei, Helmut Moser, Georg Schoefberger and August Schweizer It is certified that error appears in the above-identified patent and that said Letters Patent are hereby corrected as shown below:

Title page, item [30], below "Sep. 22, 1967...." insert -- Oct. 24, 1967 [CH] Switzerland 14852/67 -- and -- Aug. 21, 1968 [CH] Switzerland 12563/68 --. Column 3, lines 54-63, the structural formula should read -- 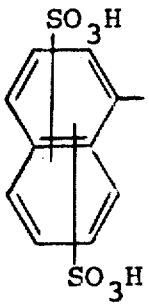 --. Column 4, line 50, delete the comma (",") after "acetate". Column 4, line 55, delete ";b". Column 4, line 64, after "1-" insert -- aminoalkyltrialkylammonium --. Column 5, line 13, "2-2-" should read -- 2- --. Column 5, line 17, "haloalkenoge" should read -- haloalkenoyl --. Column 6, line 21, the comma (",") should be a period (-- . --). Column 8, line 17, "Cl⊖" should read -- 3Cl⊖ --. Columns 9-10, Dye Ⓑ, that portion of the structural formula reading " 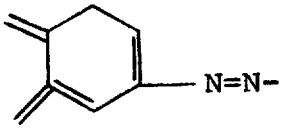 " should read -- 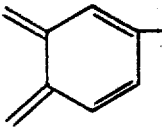 --. Columns 11-12, Dye Ⓝ, that portion of the structural formula reading "H$_2$O" should read -- H$_2$N --. Columns 11-12, Dye Ⓟ, that portion of the structural formula reading "CH$_2^\oplus$-N-" should read -- CH$_2$-$\overset{\oplus}{N}$- --.

UNITED STATES PATENT AND TRADEMARK OFFICE
CERTIFICATE OF CORRECTION

PATENT NO. : 4,198,268

DATED : April 15, 1980

INVENTOR(S) : Alfred Frei, Helmut Moser, Georg Schoefberger and August Schweizer It is certified that error appears in the above—identified patent and that said Letters Patent is hereby corrected as shown below:

Columns 11-12, Dye ®,"phthalocyanin " should read -- phthalocyanine -- and that portion of the structural formula reading "$CH_2^{\oplus}-N-$" should read -- $CH_2-\overset{\oplus}{N}-$ --. Column 14, line 50, after "stock" insert a comma (-- , --). Column 15, line 53 and column 17, line 44, that portion of the structural formula reading "phthalocyanine]-(" should read -- phthalocyanine]-(CH$_2$- --.

Signed and Sealed this

Fourth Day of November 1980

[SEAL]

Attest:

SIDNEY A. DIAMOND

Attesting Officer

Commissioner of Patents and Trademarks